J. P. CLEAL AND C. H. GIBBONS.
CAMERA.
APPLICATION FILED AUG. 22, 1918.
1,426,713.
Patented Aug. 22, 1922.
2 SHEETS—SHEET 2.
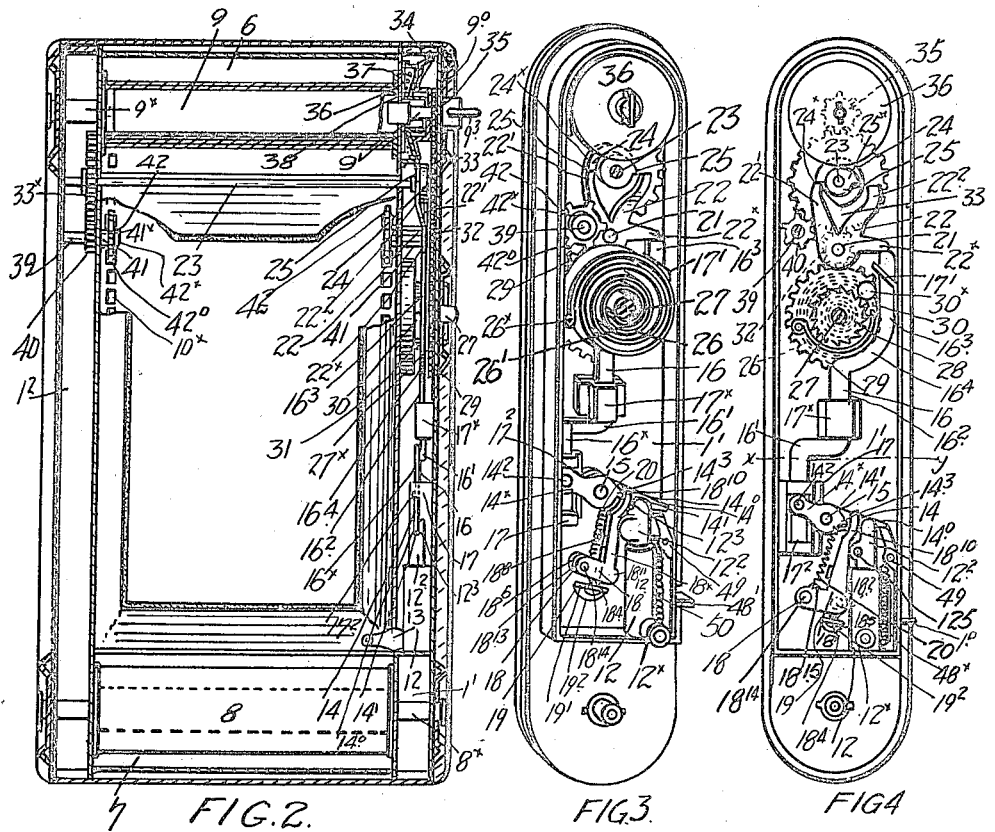
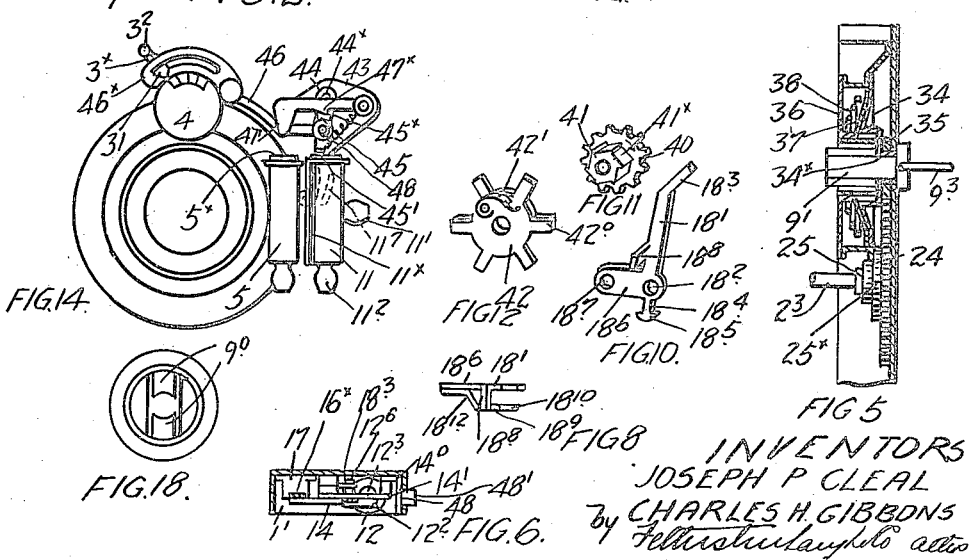
INVENTORS
JOSEPH P. CLEAL
CHARLES H. GIBBONS

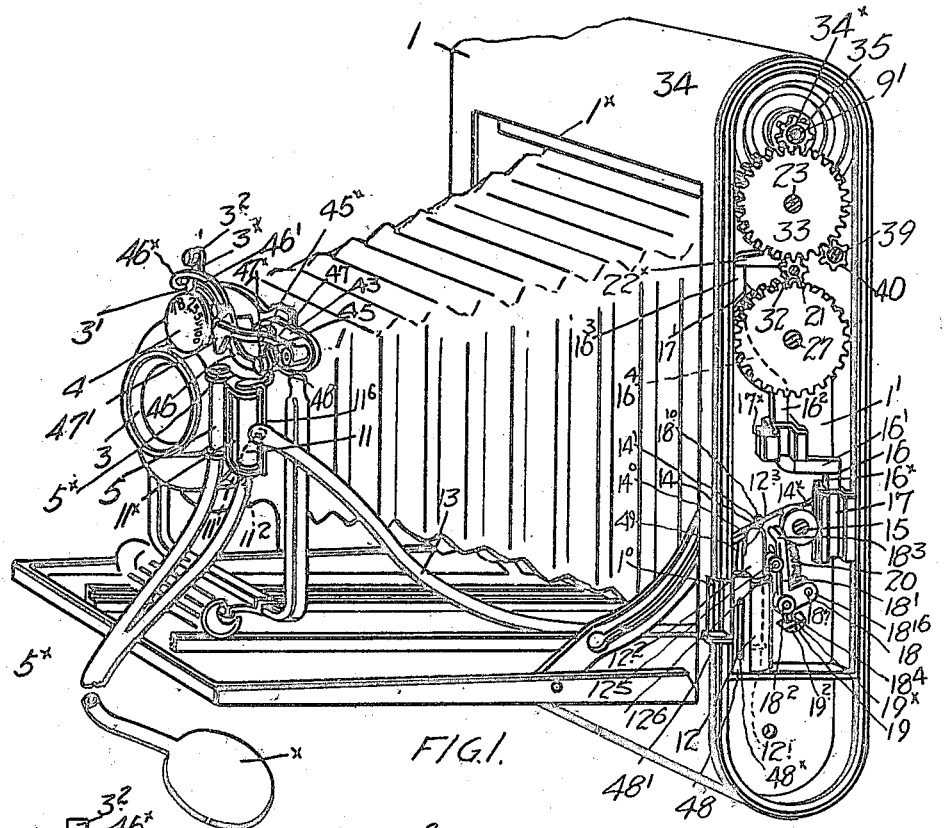

UNITED STATES PATENT OFFICE.

JOSEPH PACY CLEAL, OF TORONTO, ONTARIO, AND CHARLES HARRISON GIBBONS, OF VICTORIA, BRITISH COLUMBIA, CANADA.

CAMERA.

1,426,713.  Specification of Letters Patent.  Patented Aug. 22, 1922.

Application filed August 22, 1918. Serial No. 251,031.

*To all whom it may concern:*

Be it known that we, JOSEPH PACY CLEAL, of the city of Toronto, in the county of York, in the Province of Ontario, Canada, and CHARLES HARRISON GIBBONS, of the city of Victoria, in the Province of British Columbia, Canada, have invented certain new and useful Improvements in Cameras, of which the following is the specification.

Our invention relates to improvements in cameras and the object of the invention is to devise automatic means for winding the film to the new position after each exposure whether it be a snap shot, time or bulb exposure, and such as will in no way affect or alter the operation and functions of the camera as normally performed and as constructed previous to our invention, and it consists essentially of the following arrangement and construction of parts as hereinafter more particularly explained.

Fig. 1, is a perspective view of a camera shown in the open position and with one of the side plates of the camera body removed.

Fig. 2, is a cross sectional view through the body of the camera.

Fig. 3, is a perspective view of the end plate removed from Fig. 1 and showing the parts carried thereby as seen from the reverse side to that shown in Fig. 1.

Fig. 4, is an end elevation of the camera body with the end plate removed.

Fig. 5, is an enlarged sectional detail through the friction members and that portion of the casing body by which the friction members are carried.

Fig. 6, is a plan sectional detail on line $x$—$y$ Fig. 4.

Fig. 7, is a perspective detail of the double pawls employed in our mechanism.

Fig. 8, is a plan view of the pawls shown in Fig. 7.

Figs. 9 and 10, are perspective details of the pawl members separated apart.

Fig. 11, is a perspective detail of the gear provided with the ratchet hub employed in connection with our reel-winding mechanism.

Fig. 12, is a perspective detail of the film engaging member co-acting with the gear shown in Fig. 11.

Fig. 13, is a front elevation of the camera lens and the mechanism co-acting therewith, the parts being shown in the position when a snap shot exposure is being made.

Fig. 14, is a similar view to Fig. 13, showing the parts in the position they assume when a time exposure is being made.

Fig. 15, is a side elevation of the parts shown in Figs. 13 and 14.

Fig. 16, is a sectional view of the pneumatic cylinder carried by the lens structure for operating our rewind mechanism from the bulb.

Fig. 17, is a perspective detail of the angle plate co-acting with the pawl member 18' of our double pawl 18.

Fig. 18, is a front view of the leaf spring member by which the plunger 9' is resiliently held.

In the drawings, like characters of reference indicate corresponding parts in the various figures.

We will first describe the parts which are common to the ordinary construction of the camera.

1 indicates the casing or body of a camera and 2 the bellows secured in the usual way within the camera and withdrawable through the orifice $1^x$ of the casing 1. 3 indicates the lens which is of usual construction and provided with the usual shutter operated in the usual way. 4 indicates the disc carried by the lens structure and on which is inscribed the various exposures according to common practice, that is, time, bulb, twenty-fifth, fiftieth and one hundredth second snap shots. 3' indicates a pointer carried by the lever $3^x$ and co-acting with the disc 4 and the time indications thereon. 5 indicates a pneumatic cylinder by which the shutter is operated and provided with the usual piston head $5^x$ which rises when the bulb X is pressed so as to force air through the tube $5^x$ into the cylinder 5. Within the casing 1 and above and below the bellows 2 are located the usual compartments 6 and 7. In the compartment 7 is placed the film roll 8, held in the usual manner at the ends by spring pressed plungers $8^x$ and 8'. 9 indicates the take-up spool located in the compartment 6 and held in the usual manner by the spring pressed plungers $9^x$ and 9'. 10 indicates the film which passes upwardly from the film roll 8 and is attached to the core of the spool 9.

It will be understood that the ordinary camera is operated in one of several ways: First what is termed a "snap shot" can be taken, there usually being about three retardations on the index disc such as shown at 4. These so called snap shot operations can in no way be controlled by the bulb other than to release when the proper focus and position have been acquired. Second, a bulb exposure can be made by moving the indicator point to the proper indicating position, such as is indicated by the letter B on the indicating disc 4 and then pressing the bulb and holding it compressed the length of time for the exposure and releasing it. Compressing the bulb opens the shutter and releasing the bulb closes it. Third, a time exposure can be made by moving the indicator pointer to the other or extreme indicating position indicated by the letter T and the bulb compressed and released to open the shutter. After the proper predetermined length of time, the bulb is again compressed and released, thereby closing the shutter, thus performing two distinct operations.

It will be understood, of course, that according to common practice it is necessary to wind the film forward manually to a new position after each exposure. If anything should happen to disturb the focus or any object should accidentally intervene between the camera and the subject the opportunity to take the picture may perhaps be lost before the film could be moved to the new position. It is to overcome this difficulty and provide automatic means for moving the film to the new position after each exposure that the improvement hereinafter to be described is designed.

We will first describe the construction and operation of our device in relation to taking a snap shot picture.

The lever $3^x$ is provided with an extension $3^2$ by which it may be manually operated. 11 indicates a pneumatic cylinder which is supported by a bracket $11^x$ carried by the frame of the lens 3 adjacent to the pneumatic cylinder 5. About half way up the side of the cylinder 11 is formed a nipple projection $11'$, the bottom of the cylinder being provided with a nipple projection $11^2$. The rubber tube $5^x$ extending from the bulb to the pneumatic cylinder 5 is provided with a branch $5'$ which is connected to the nipple $11^2$ forming the tube $5^x$ into Y formation, one branch as above indicated being connected to the cylinder 5 and the other branch to the cylinder 11. This construction ensures that the shutter will be operated as at present immediately air enters the cylinder 5. $11^3$ indicates the plunger of the cylinder 11 provided with a plunger rod $11^4$ having a head $11^5$.

The construction above described in relation to the cylinder 11 is such as to prevent any action of certain parts to be hereinafter described until the cylinder plunger has reached a position above the nipple $11'$, which would thereby open the air port formed by such nipple and allow the air to pass outwardly therethrough.

Within the casing 1 of the camera at one side thereof is formed a compartment $1'$ in which is located portion of our operating mechanism.

12 indicates a pneumatic cylinder located within the compartment $1'$ and provided at its lower end with a nipple $12^x$ extending outwardly from the periphery thereof. 13 indicates a tube connecting the nipple $11'$ of the cylinder 11 with the nipple $12^x$ of the cylinder 12. $12'$ indicates a plunger co-acting with the cylinder 12 and provided with a plunger rod $12^2$ having a notched upper end $12^3$.

When the plunger $11^3$ is forced upwardly above the nipple $11'$ air passes through the tube 13 into the lower end of the cylinder 12, forcing the plunger thereof upwardly.

14 indicates a rocking pawl pivotally mounted on a stud 15 carried by the casing wall of the camera. One portion of the pawl 14 extending to one side of the stud 15 is offset from the other portion extending to the other side of the stud 15, these portions being indicated by the numerals $14^x$ and $14'$. The portion $14'$ is provided with a rounded lower portion fitting within and resting upon the base of the notch $12^3$ of the plunger rod $12^2$.

It will, of course, be understood that the portions $14'$ and $14^x$ are rigidly connected together and that when the plunger rod $12^2$ is forced upwardly as above described the pawl 14 is swung upon the stud 15.

16 indicates a bar, the lower portion $16^x$ of which is slidably held in a vertical bearing bracket 17. The intermediate portion $16'$ is offset so that the portion $16^2$ thereof is located centrally of the camera casing and is slidably supported in a bracket $17^x$. The upper portion $16^3$ is carried over to the front portion of the casing by the intermediately curved portion $16^4$ for a purpose which will hereinafter appear, the upper portion $16^3$ being slidably held in a bracket plate $17'$ carried by the casing.

It will be noted that the front face of the bracket 17 is provided with a slotted opening $17^2$ exposing the corresponding face of the bar 16. To this exposed portion is pivotally connected the opposite end of the pawl 14 by the pivot pin $14^2$. It will thus be seen that when the plunger rod $12^2$ is carried upwardly the pawl 14 is tilted on its pivot formed by the stud 15 and the bar 16 thereby drawn downwardly, the pin $14^2$ fitting freely enough within the pawl 14 to allow of its downward movement. When the pawl 14 and the bar 16 connected thereto has reached the limit of its stroke it is locked in position by mechanism which we will now describe:

The portion $14^x$ of the pawl 14 is provided with a cam like projection $14^3$. 18 indicates a double pawl clearly shown in detail in Figs. 7, 8, 9 and 10. The double pawl 18 is formed by two pawl members $18^x$ and $18'$. The pawl $18'$ is pivotally secured to the wall of the casing 1 at $18^2$. The upper end of the pawl $18'$ is provided with an outwardly inclined portion $18^3$ and the lower end with a depending portion $18^4$ having a head $18^5$. $18^6$ indicates a portion extending at right angles to the body of the pawl $18'$ and provided at its end with an orifice $18^7$. $18^8$ indicates a lateral projection extending from the body of the pawl $18'$ for a purpose which will hereinafter appear.

19 indicates an angular plate provided with a slot $19^x$ in its horizontal flange $19'$ a right angular or vertically disposed flange $19^2$ being secured to the side plate of the camera. The depending portion $18^4$ as above described passes through the slot $19^x$ and thereby limits the motion of the pawl member $18'$. To the pawl member $18'$ at $18^7$ is pivotally secured the pawl member $18^x$. The main portion $18^9$ of the pawl $18^x$ is provided at its upper end with a curved portion $18^{10}$ which is designed to be brought into engagement with the cam projection $14^3$ of the pawl 14. The lower portion $18^{11}$ of the pawl $18^x$ is offset at $18^{12}$, the extreme outer end of the portion $18^{11}$ being provided with an orifice $18^{13}$ through which and through the hole $18^7$ passes a pivot pin $18^{14}$ pivotally connecting the pawl members together. $18^{15}$ is a small lug extending from the upper edge of the portion $18^{11}$ of the pawl $18^x$.

20 indicates a tension spring connecting the lug $18^5$ with the pawl member $14^x$ at the same side of the stud 15 as the cylinder 12. The lateral projection $18^8$ of the pawl member $18'$ extends against the inner edge of the pawl member $18^x$ as clearly indicated in Fig. 7 and thereby limits the movement of the pawl $18^x$.

$12^4$ indicates a lug extending from the plunger rod $12^2$. $12^5$ indicates a pin extending from such lug and on which is journaled a roller $12^6$. The action of this pawl is as follows:

The pawl $18'$ is pivotally mounted upon the plate of the camera casing and upon which all the mechanism is mounted. The pawl $18^x$ is pivotally mounted upon the pawl $18'$. The angular plate $19'$ limits the motion of the pawl $18'$ and the portion $18^8$ on the pawl $18'$ limits the movement of the pawl member $18^x$. The spring 20 fastened to the pawl member $18^x$ and the upper end of the pawl 14 outside the fulcrum point tends to draw the outer portion of the pawl 14 down and the fulcrum point formed by the pin $18^4$ upward. This action would tend to force the top part of the pawl $18'$ to the right and the top part of the pawl $18^x$ to the left, in other words, spreading the pawl members apart. The upward extension of the pawl member $18'$ prevents this spreading action and forces the movement of both pawls at the top to the right and away from the fulcrum point of the pawl 14.

When the plunger in the air cylinder 12 rises, the roller $12^6$ contacts with the under bevelled portion $18^3$ at the top of the pawl member $18'$, forcing the pawl against the tension of the spring 20 to the left. The pawl $18^x$ because of its natural inclination follows this movement until it is arrested by the inside curved portion at the top of the pawl coming in contact with the stepped or cam portion $14^3$ of the pawl 14. As soon as this cam portion is raised sufficiently the top end of the pawl $18^x$ snaps into position under the cam portion $14^3$. The pawl $18^x$ will be held in this position until the roller $12^6$ has receded below the under bevelled portion $18^3$ of the pawl member $18'$. The action of the spring 20 will then carry the pawl back to position. The pawl $18'$ by the natural action of the spring and its position with relation to the fulcrum point of the pawl and the pawl $18^x$ will be carried back by the upper extension $18^8$ of the pawl $18'$. This action will continue until the upper end of the pawl $18^x$ has been drawn from beneath the cam portion $14^3$ on the pawl 14 when the spring 20 will cause the outer end of the pawl 14 to be snapped down quickly, rocking the pawl on its fulcrum at the point formed by the stud 15, carrying the pivot pin $14^2$ upward and thus forcing the bar 16 upward very rapidly, until the upper end which is guided by the slotted plate $17'$ strikes to co-act with the mechanism which we will hereinafter describe.

21 indicates a stud carried by the end plate of the casing 1. 22 indicates a double pronged pawl swung upon the stud 21 and provided with a laterally extending arm $22^x$, against which the upper end of the bar 16 strikes when forced upwardly as hereinbefore described. The pawl 22 is provided with two prong members $22'$ which extend vertically upward, and the prong member $22^2$, the upper end of which is slightly offset out of alinement with the pawl prongs $22'$. 23 indicates a shaft journaled in the side walls of the casing 1. It will be noted that the opposite side of the casing is also formed with a compartment $1^2$ corresponding to the compartment $1'$. It will also be noted that the shaft 23 extends through these compartments $1'$ and 1² as will be clearly seen on referring to Fig. 2.

24 and 25 indicate cams secured to the shaft 23. The cam 24 is provided with a shoulder 24ˣ which normally engages with the upper end of the pawl prong 22'. The cam 25 is provided with a shoulder 25ˣ which is in the path of and directly opposite the offset upper end of the pawl prong 22². The cams 24 and 25 and the prong pawl members 22' and 22² are for the purpose of limiting the rotation of the shaft 23 to one revolution at each operation.

We will now describe the mechanism by which the shaft 23 is driven:

26 indicates a clock spring which is secured at one end 26ˣ to the wall of the camera case and at the opposite end at 26' to a short shaft 27 which is journaled in the side walls of the camera case.

28 indicates a ratchet wheel secured to the shaft 27. The outer end of the shaft 27 is provided with a swingable gripping handle 27ˣ of the type commonly employed and used in the turning of the rewinding roll of a camera film.

29 indicates a gear mounted upon the shaft 27. 30 indicates a pawl pivotally mounted at 30ˣ upon the gear 29 and held in engagement with the ratchet wheel 28 by a leaf spring 31 carried by the gear. The result of winding or the storage of power motion in the spring 26 would be to force the bevelled portions of the ratchet 28 to pass the lower end of the pawl 30 and said pawl would snap into each one of the notches formed between the teeth of the ratchet as the ratchet is turned but would prevent the reverse movement of the ratchet by the fact of the pawl catching in the teeth thereof, that is to say, the short face of the ratchet would be forced against the end of the pawl until released. The action of the spring would cause the gear 29 to revolve in the same direction as the unwinding of the spring and in turn would cause a pressure to be exerted against the pinion 32 mounted upon the stud 21 and in engagement with the gear 33 secured to the shaft 23.

34 indicates a conical friction member mounted upon the spring plunger 9', such conical member being provided with a sleeve-like portion 34ˣ surrounding the spring plunger 9'. Upon this sleeve-like portion is secured a pinion 35 which is in mesh with the upper peripheral portion of the gear 33. 36 indicates a casing surrounding the member 34 and in which is also contained a movable conical friction member 37, such member being splined to the spring plunger 9'. The conical friction members 37 and 34 are resiliently held together by a conical spiral spring 38.

It will be readily understood that so long as the pawl prong 22' maintains this position and contacts with the shoulder 24ˣ of the cam 24 it acts as a stop element to such cam and no movement of the mechanism which would be actuated by the spring 26 can be possible until this cam is released. Then the movement of the parts would at once take place. The action of the bar 16 against the extended portion 22ˣ of the pawl 22 provides this release by means of the blow which the bar 16 administers to the part 22ˣ when the bar 16 is released as has been previously described. This blow causes the prong portion 22' to move outward from the centre and from beneath the shoulder 24ˣ, the other prong portion 22² simultaneously moving in towards the centre of motion of the cam and beneath the shoulder 25ˣ of the cam 25. Thus the cam 24 would be released and would allow of one revolution of the shaft 23. As this revolution is performed the prong 22² is in engagement with the periphery of the cam 25, the motion starting from beneath the shoulder 25ˣ, the cam revolving in the direction of arrow. After such cam has revolved about two-thirds of its revolution the radius of the cam gradually increases forcing the prong 22² outward and thereby carrying the prong 22' inward towards the centre of motion, and as the revolution is completed the prong 22' is carried again beneath the shoulder 24ˣ thereby positively stopping further revolution of the shaft 23. It will thus be seen that motion imparted will be positive and the result will be that one complete revolution of the shaft 23 will be performed and the rotation of the core 9 of the film take-up roller connected to the shaft 23 through gear 33 and pinion 35 and friction members 34 and 37 will be caused every time that the portion 22ˣ of the pawl 22 is struck by the bar 16, and the bar 16 would not be moved except through an agency of the air cylinder 12, and co-acting parts which in turn is actuated through the bulb tube 5ˣ as has been previously described.

We will now describe the mechanism by which power is transmitted directly to the film.

On the opposite end of the shaft 23 is mounted a gear 33ˣ located in the compartment 1² of the camera case. The gear wheels 33 and 33ˣ are of the same form and correspond exactly one to the other.

39, 39, indicate stud shafts mounted in each side wall of the main casing 1 and extending respectively across the compartments 1' and 1² and projecting into the interior of the camera in front of the path of the film strip. Upon each stud 39 is mounted a pinion 40, the pinion 40 meshing with each of the gear wheels 33 and 33ˣ. Each gear wheel 40 is provided with a hub 41 having a ratchet periphery 41×. 42 indicates a spur wheel. A spur wheel is mounted freely upon each stud 39 and held thereon by a collar 42× secured to the corresponding shaft. 42′ indicates a pawl pivotally mounted upon each spur wheel 42 and spring held in engagement with the ratchet hub 41.

It will, of course, be understood that the spur wheel 42 is mounted on each of the shafts 39 and that each spur wheel is located in proximity to the film strip and slightly within each edge thereof. The film strip 10 is provided in proximity to its edge and in a line with the spur wheels 42 with a longitudinal row of perforations 10× into which the spurs 42° of the spur wheel 42 extend.

It will be understood that the ratchet hub 41 is provided with the same number of teeth as there are projections 42° upon the spur wheel 42. This construction is designed so as to transmit positive motion in the forward direction to the film strip but to permit of movement in the opposite direction for a purpose which will hereinafter be described.

It will be apparent that when power from the spring 26 is allowed to be exerted to move the mechanism driven thereby the spur wheel 42 will be revolved in a direction to move the film in a corresponding direction by engaging with the perforations 10×, that is to say, the film strip will be moved forward in the direction of arrow (see Fig. 2) the required distance because the spurs of the spur wheel 42 are held in positive alignment and will protrude through the slotted perforations, moving the film by each operation the required distance. The mechanism thus described, of course, does not necessarily take up the film but will merely place the proper section of the film at the point of exposure at each action of the camera. The film roll is inserted according to common practice within the compartment 7 of the camera body and is wound upon the core of the roll 9.

It will be also understood that the winding mechanism of the take-up spool must provide for the difference in diameter of the roll wound upon the core 9, the roll gradually increasing in diameter as the film is fed thereon. At the start, of course, the roll is only naturally the thickness of the core upon which it is wound but as more and more of the film at each successive operation of the camera is rewound on to the core, the diameter of the core will increase and the tendency would be to pull the film faster than it would be fed forward by the spur wheel 42, which means that the rewinding spool must be arranged to slip but at the same time to have tension enough to rewind the film that is fed to it. To accomplish this upon the ordinary rewinding centre of the camera which is formed by the spring pressed plunger 9′ are mounted two friction members 34 and 37 hereinbefore described, the member 34 being connected to the pinion 35 and through the gear 33 to the shaft 23 which is driven by the spring 26 as has been before described.

This would mean that the friction member 34 moves positively and that frictional slippage occurs between it and the other member 37. These members frictionally engage, the friction member 37 being splined to the spring plunger 9′ in such a way as to transmit motion to the plunger to revolve the roller 9. The portion 9′ is held in its forward position by the leaf spring 9°. This construction is to enable the portion 9′ to be pulled outwardly so as to insert the new spool and to be returned to its inward position as soon as it is released. To the head of the plunger 9′ is pivotally secured the handle 9³ of the type which is commonly employed for this purpose. By this means also the spool 9 may be turned in order to wind the film thereon to bring it to the position for the first exposure, there being sufficient slippage between the members 34 and 37 to allow the spool to be independently moved to wind the film forward to the proper first exposed position.

It will be understood that the ratchet 41 and pawl 42′ previously described would allow the film to be drawn forward into the proper position, the pawl 42 slipping over the ratchet in the direction of arrow (see Fig. 11) and dropping into position at any point to pick the film up the moment power is supplied in the proper direction, that is to say, that the gear 40 will revolve in the direction of arrow thereby carrying the short face of the ratchet against the end of the pawl carried by the spur wheel 42 to revolve such spur in the direction to feed the film on to the spool 9.

The mechanism and operation so far described relates to the operation when a snap shot is being taken. With a bulb exposure, that is, where the bulb has been held pressed for a definite time and then released to open and shut the shutter, the operation is the same as when taking a snap shot, that is, by the pressure of the bulb the parts are set to trip the releasing mechanism of the spring drive locking mechanism and by the release of the bulb the tripping mechanism is tripped to release the drive and allow it to operate.

To this end the operator will move the part 3² to the proper indicating mark for the exposure desired, realizing that the movement of the indicator 3² when it has been moved from a snap shot to a bulb exposure has not interfered in any way with the natural working of the shutter or any other part but that if a time exposure is made the movements which have been described must be prevented. For a time exposure the two compressions of the bulb must necessarily differ in function.

When it is necessary to make two compressions of the bulb to actuate the camera to open and close the shutter the part $3^2$ would be moved with the indicating pointer to the left of its extreme position, that is to say, with the pointer opposite the indicator letter T.

43 indicates a standard plate extending outwardly from the frame of the lens 3. 44 indicates a link pivoted at its upper end at $44^\times$ to the standard plate 43, the lower end depending freely. 45 indicates a pawl pivotally mounted intermediately of its length upon the lower end of the link 44, the upper end of the pawl being provided with a ratchet notch $45^\times$ and the lower end of the pawl with an out-turned portion $45'$. 46 indicates a link pivotally mounted at one end upon the same pivot point which connects the pawl 45 to the link 44. The link 46 extends inwardly towards the lens frame and then upwardly circumferentially therearound, the extreme end being formed by an enlarged arc-shaped portion $46^\times$ extending around the upper portion of the indicating plate 4 and provided with a concentric slot $46'$ through which the pointer $3'$ of the indicating lever $3^\times$ passes. Also mounted upon the standard plate 43 is a pawl 47 provided at its lower edge with a ratchet tooth $47^\times$ normally engaging the ratchet notch $45^\times$ of the pawl 45. The free end of the pawl 47 is offset outwardly and provided with a depending portion $47'$ extending over the head $5^\times$ of the piston of the cylinder 5. 48 indicates a tension spring connecting the lower portion of the pawl 45 with the pawl 47 in proximity to its pivotal point. The head $11^5$ of the plunger rod $11^4$ located in the cylinder 11 is provided with a depending extension $11^6$ upon which is mounted a cam member $11^7$ and spring held pawl $11^8$. The upper end of the cam member $11^7$ inclines downwardly towards the pawl as clearly indicated in Figs. 13 and 14. When the device operates normally, that is, when a snap shot or bulb exposure is used, the lower end of the pawl 45 engages the inclined upper face of the cam $11^7$ and passes downwardly between the pawl $11^8$ and the cam $11^7$. When, however, it is desired to take a time picture and the pointer $3'$ is thrown to the extreme or timed position, the pointer passing through the slot $46'$ engages the end of the slot and draws the link 46 over towards the lens frame thereby swinging the link 44 upon its pivot $44^\times$ and carrying the lower end of the pawl 45 in a corresponding direction, the upper end of the pawl being held in a stationary position by the ratchet tooth $47^\times$ of the pawl 47. By this means the lower end of the pawl 45 is swung into a position over the spring held pawl $11^8$. Under these conditions when the bulb is pressed to take a time picture air enters the cylinder 5, operating the shutter to open it. Simultaneously air enters the cylinder $11^7$ forcing the pawl $11^8$ upward into contact with the lower end of the pawl 45 thereby preventing the complete upward movement of the piston $11^3$ preventing it passing above the opening of the nipple $11'$ and thereby preventing air passing through such nipple to operate the rewinding mechanism of the film.

By the first pressure of the bulb and the upward movement of the head $5^\times$ the pawl 47 is raised so as to carry the tooth $47^\times$ out of the notch 45 thereby releasing the upper end of the pawl 45. The pawl, however, is held from swinging back to its normal position by means of the upward pressure of the pawl $11^8$ against the lower end of the pawl 45. As soon, however, as the bulb is released this upward pressure is released and the upper end of the pawl 45 will spring forward. In this position the long face of the tooth $47^\times$ of the pawl 47 will rest on the upper end of the pawl 45 and the tooth will be out of engagement with the recess. Upon the next pressure of the bulb the pawl $11^8$ and cam $11^7$ will be carried upward in such relation to the lower end of the pawl 45 that such lower end will strike the inclined upper end of the cam $11^7$ and be forced inwardly between the cam and the pawl $11^8$ allowing the piston $11^3$ to rise to the full extent so that air will pass through the orifice of the nipple $11'$ and actuate the rewind mechanism. Simultaneously by this movement the upper end of the pawl 45 would be carried back so that the tooth $47^\times$ would re-engage with the notch $45^\times$. Thus it will be seen that means are provided whereby the first pressure of the bulb which opens the shutter will be inoperative upon our rewind mechanism, whereas the second pressure of the bulb or pressure which closes the shutter will operate our rewind mechanism and move the film to the next exposure position. This operation will be repeated as long as the indicating pointer $3'$ is in the "time" position.

It may be necessary at times to move the film independently of the bulb. In order to accomplish this we have provided the pawl 14 with an extension $14^\circ$. The front wall of the camera body is provided with a vertical slot $1^\circ$ extending into the compartment $1'$. 48 indicates an angle plate fitting into the corner of the compartment $1'$, one arm of which is provided with a vertical slot $48^\times$ and the other arm with an outwardly extending finger piece $48'$ extending through the slot $1^\circ$. 49 indicates a member pivotally mounted upon the angle plate 48 having an out-turned upper end extending beneath the extension 14°. The member 49 is spring held in position by a tension spring 50. It will thus be seen that when it is desired to operate the rewind mechanism manually all that it is necessary to do is to force the finger 48' upwardly in the slot 1° carrying the member 49 against the extension 14° so as to rock the pawl 14 in the same manner as it is lifted by the piston of the cylinder 12 when the latter is actuated by the compression of the bulb.

From this description it will be seen that we have devised a rewind mechanism for camera films which will be operated automatically by the operation of the bulb and which may be operated either by a single pressure of the bulb as when taking a snap shot or bulb exposure, or by every second pressure of the bulb when taking a time picture, and that we have devised such a device which in no way impairs the ordinary operative conditions under which a camera is used and that all things which can be done by a camera at the present time by the operator can be done with a camera with our improvement attached, and also our device accomplishes this purpose without any extra conscious effort on the part of the operator and also if desired the film may be manually wound to its new position.

Also by our device the rewind being automatically accomplished after each exposure always leaves the camera instantly ready for use so that if anything should happen to disturb the focus or any object should get accidentally between the camera and the subject, the opportunity for taking the picture will not be lost.

Although we describe mechanism driven by spring means we do not wish to confine ourselves to this particular means but desire to cover means broadly to automatically move the film, the spring driven mechanism only being adopted for the reason that it could be more easily incorporated into the form of camera in which the mechanism has been inserted. Other means could be employed for providing the motive power whereby the mechanism is operated.

What we claim as our invention is:

1. In a film feeding device for cameras, the combination with the motor driven film rolls, of a pneumatic plunger arranged in the camera case, a rotating stop member connected with the motor, a pawl adapted to engage said stop member to arrest the motor, means operated by said pneumatic plunger adapted to strike the pawl to release it from engagement with said rotating stop member, and means operated by the motor for returning the pawl to its stop position.

2. In a film feeding device for cameras, the combination with the motor driven film rolls, of a pneumatic plunger arranged in the camera case, a rotating stop member connected with the motor, a rocker member operated by said plunger, means for holding the rocker member following the initial operation of the plunger, a pawl adapted to engage said stop member to arrest the motor, a spring operated bar slidably arranged in the casing and connected with said rocker member and adapted to engage said pawl to release same, means actuated by the return of said plunger for releasing said rocker member and sliding bar to allow the bar to strike the pawl and release it from the stop member, and means operated by the motor for returning said pawl to its stop position.

3. In a film feeding device for cameras, the combination with the motor driven film rolls, of a pneumatic plunger arranged in the camera case, a rocker member engaging said plunger, a pawl pivotally mounted in the case and engaging said rocker member to hold it in a raised position following the outward movement of the plunger, a spring connecting said pawl and rocker member, means operated by the return of the plunger for withdrawing said pawl from the rocker member, a slidable bar connected with the rocker member, a rotatable stop connected with the motor, a pawl engaging said stop and adapted to be disengaged therefrom by the operation of said bar following the release of the rocker member.

4. In a film feeding device for cameras, the combination with the motor driven film rolls and a stop member carried thereby, of a pneumatic plunger arranged in the camera case, a rocker member engaging said plunger, means for holding the rocker member in a raised position following the outward operation of the plunger engaging same, a bar slidably arranged in the case and engaging said rocker member, a pawl adapted to be operated by said bar, means for automatically moving said bar to release said pawl from the stop member, and manually operable means for operating said bar.

5. In a film feeding device for cameras, a spring driven rotating element, a rocking member having prong arms, a cam carried by the rotating element engaging the locking member to form a stop, an air pressure tube, mechanism set by air pressure exerted within the tube and released by the relief of such pressure for rocking the member from the stop position, and means for automatically carrying such member back to the stop position.

6. In a film feeding device for cameras, a spring driven rotating element, a bifurcated rocking member, a cam carried by the rotatable element and arranged between the arms of the bifurcated member having a portion adapted to engage one of said arms to form a stop, a portion adapted to engage the other of said arms to rock the same, and a mechanism operated by air pressure and released by the relief of such pressure to rock said member from its stop position.

7. In a film feeding device for cameras, a spring driven rotating element, a rocking member, a cam carried by the rotating element engaging said rocking member and held thereby, an arm extending from the rocking member, a striking bar held in guide ways, and adapted to strike said arm, means operated by air pressure for withdrawing the striking bar to the striking position, means operated by the relief of the air pressure for releasing such bar, spring means carrying the bar to strike against the arm of the rocking member, and means for automatically carrying the parts back to their normal position.

8. In a film feeding device for cameras, a spring driven rotating element, a rocking member, a cam carried by the rotating element engaging said rocking element to form a stop, an arm extending from the rocking member, a striking rod held in guide ways, an air cylinder, a piston for the cylinder, a rocking pawl connecting the rod of the piston with the striking bar, locking mechanism for holding the pawl in the striking position, and spring means for releasing the locking means and carrying the striking bar to the striking position.

9. In a film feeding device for cameras, a spring driven rotating element, a rocking member, a cam carried by the rotating element engaging the rocking member to form a stop, an arm extending from the rocking member, a striking rod held in guide ways, an air cylinder, a piston for the cylinder, a rocking pawl connecting the rod of the piston with the striking bar, a shoulder formed on the pawl, a pawl pivotally mounted in the case and adapted to be engaged by the piston, a pawl mounted on the latter pawl and adapted to engage the shoulder formed on said rocking pawl connecting the piston rod to the striking bar, and means for suddenly releasing the latter holding pawl from engagement with the rocking pawl.

10. In a film feeding device for cameras, a spring driven rotating element, a rocking member, a cam carried by the rotating element engaging the rocking member to form a stop, an arm extending from the rocking member a striking rod held in guideways, and air cylinder, a piston for the cylinder, a rocking pawl connecting the rod of the piston with the striking bar, a shoulder formed on the pawl, a member pivotally mounted in the case and having an inclined portion adapted to be engaged by a projection from the piston and having an offset portion, a pawl pivotally mounted on the offset portion of the said arm and adapted to engage and lock the rocking pawl, a lateral projection on said pivotal arm adapted to engage said pawl upon the recession of the piston to effect the withdrawl of the pawl carried by said pivotal arm from engagement with the rocking arm to release the striker arm, and spring means for rocking the rocking pawl to operate the striker arm with a sharp movement.

11. In a device of the class described, the combination with the striking bar and pressure supply tube, of a cylinder to which the tube is connected, a piston and piston rod for the cylinder and resiliently held pawl mechanism operated by the upward movement of the piston rod to lock the striking bar in the striking position and capable of automatic release as the piston rod is returned to its normal position.

JOSEPH PACY CLEAL.
CHARLES HARRISON GIBBONS.

Witnesses as to signature of Joseph Pacy Cleal:
    GEO. F. WOLFF,
    O. J. BUCKLEY.

Witnesses as to signature of Charles Harrison Gibbons:
    C. W. MARTIN,
    E. B. McCARTER.